No. 852,171. PATENTED APR. 30, 1907.
J. R. EDDY.
WRENCH.
APPLICATION FILED AUG. 16, 1906.
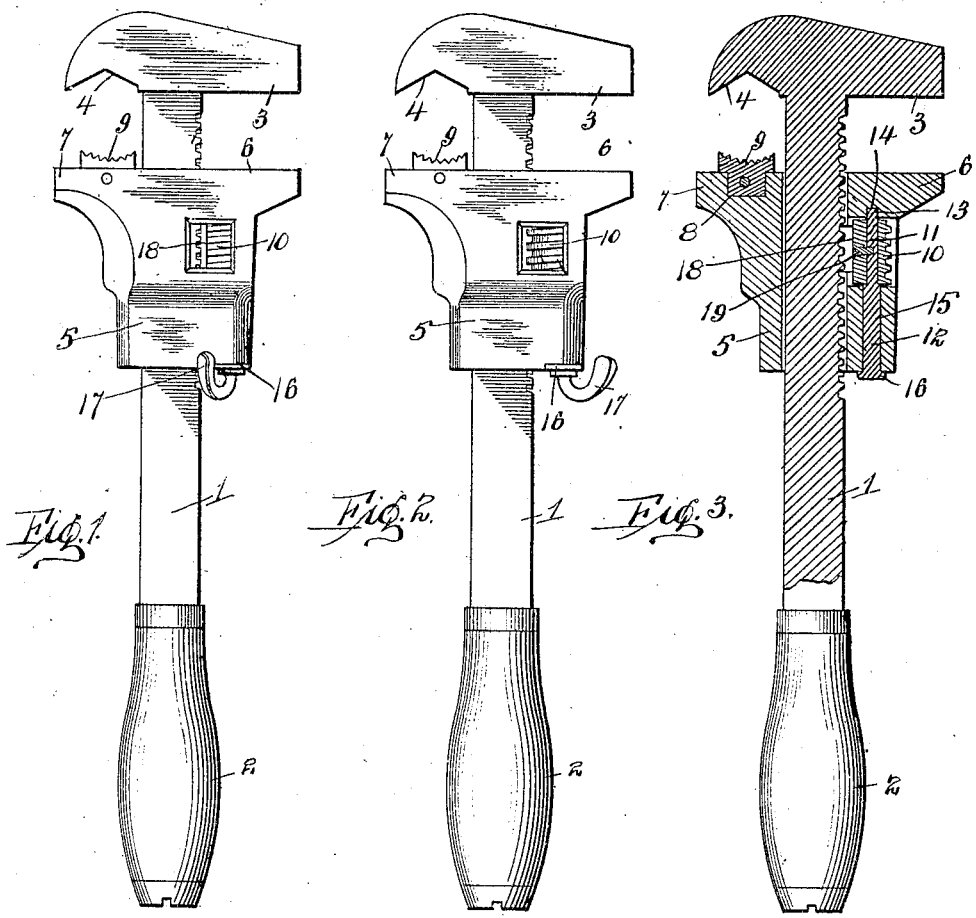
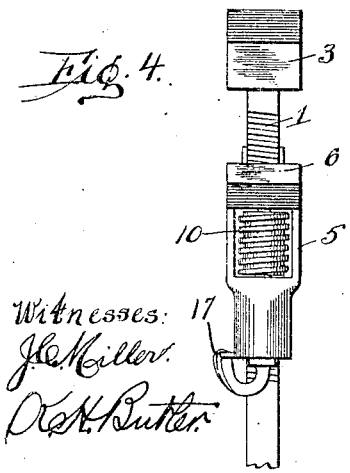
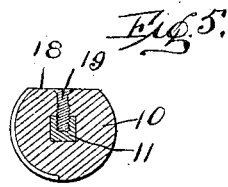
Witnesses:
Inventor.
Joshua R. Eddy.
Attorneys.

UNITED STATES PATENT OFFICE.

JOSHUA R. EDDY, OF SLICKER, WEST VIRGINIA.

WRENCH.

No. 852,171.      Specification of Letters Patent.      Patented April 30, 1907.

Application filed August 16, 1906. Serial No. 330,911.

*To all whom it may concern:*

Be it known that I, JOSHUA R. EDDY, a citizen of the United States of America, residing at Slicker, in the county of Tyler and State of West Virginia, have invented certain new and useful Improvements in Wrenches, of which the following is a specification, reference being had therein to the accompanying drawing.

The invention relates to wrenches, and its object is to provide a wrench in which the movable jaw may be quickly adjusted upon the shank and securely locked in any position to which it may be adjusted.

The invention consists of novel means for locking the movable jaw upon the shank, and for quickly releasing the locking device to permit the free adjustment of said movable jaw.

The construction of the improvement will be fully described hereinafter in connection with the accompanying drawing which forms a part of this specification, and its novel features will be defined in the appended claims.

In the drawing, Figure 1 is a side elevation of a wrench embodying the invention, showing the locking dog of the device in its disengaged position, Fig. 2 is a similar view showing the dog in its locking engagement with the toothed shank, Fig. 3 is a central longitudinal section of the wrench showing the dog in its disengaged position, Fig. 4 is a front elevation partly broken away, and Fig. 5 is a horizontal section of the locking dog, on an enlarged scale.

The reference numeral 1 designates the toothed shank of the wrench provided with a handle 2 and preferably formed with two oppositely projecting fixed jaws 3 and 4 the former being adapted for application to nuts and the latter to pipes or like circular objects, the gripping face of the jaw 4 being of inverted V-shape.

Adjustably supported upon the shank 1 is a housing 5 having a longitudinal opening for the passage of the shank, and two integral jaws 6 and 7 adapted to co-act respectively with the fixed jaws 3 and 4. The jaw 7 is recessed as at 8 to receive a removable curved gripping plate 9 of concave form to adapt it to engage a rounded surface.

The housing 5 is recessed to receive a movable dog 10 having a square bore to receive the squared upper portion 11 of a rod 12. The upper end 13 of the rod is round in cross section to fit a bearing 14 of the housing, and the lower portion of said rod is also round in cross section to fit the circular bore 15 of the housing. The rod is provided with a collar 16 at its lower end, and with a hook-shaped finger piece 17 extending from its lower end. The dog is round in cross section with one of its sides cut away to provide a flat surface 18 while the circular portion of the dog is threaded to engage the teeth of the shank. The dog is secured to the squared portion 11 of the rod by a set screw 19, the head of which is countersunk to have it flush with the flat surface of the dog and by this means the rod is retained in position.

The utility and operation of the device constructed as thus described will be readily understood. By means of the finger-piece 17 the dog may be readily turned to present either its smooth flat surface 18 or its threaded surface toward the teeth of the shank, and it will be obvious that when the flat side of the dog is next to the teeth the housing can be readily moved upon the shank, and when the threaded face of the dog is turned to the position shown in Fig. 2 of the drawing, the movable jaw is locked in engagement with the shank. A slight movement of the rod effects the desired locking or disengagement of the dog, and the lower end of the housing serves as a stop for the finger-piece, so that the user will know that the dog is in proper position to permit of adjustment when the finger-piece is in contact with the housing.

What I claim and desire to secure by Letters Patent, is:—

In a wrench, the combination with a toothed shank provided at its outer end with fixed jaws, a housing mounted to slide on the shank, having jaws at its outer end and having a recess in one side extending from the outer face of the housing to the central opening therethrough, a rod journaled in the housing having a squared portion lying within said recess, a dog mounted on said squared portion of the rod, having a flat face, and having teeth on a part of the remainder of its face, a set screw fixedly securing the dog to said rod, and a finger piece carried by the outer end of said rod and curved upwardly to over-lie the housing whereby when the teeth of said dog are in engagement with the teeth of the wrench the over-lying free end of said finger piece engages with the said housing.

In testimony whereof I affix my signature in the presence of two witnesses:

JOSHUA R. EDDY.

Witnesses:
  J. W. WAY,
  H. E. BARNHOUSE.